July 23, 1935.   S. M. COFFMAN   2,009,107
FREEWHEELING TRANSMISSION MECHANISM
Filed May 7, 1932   4 Sheets-Sheet 3

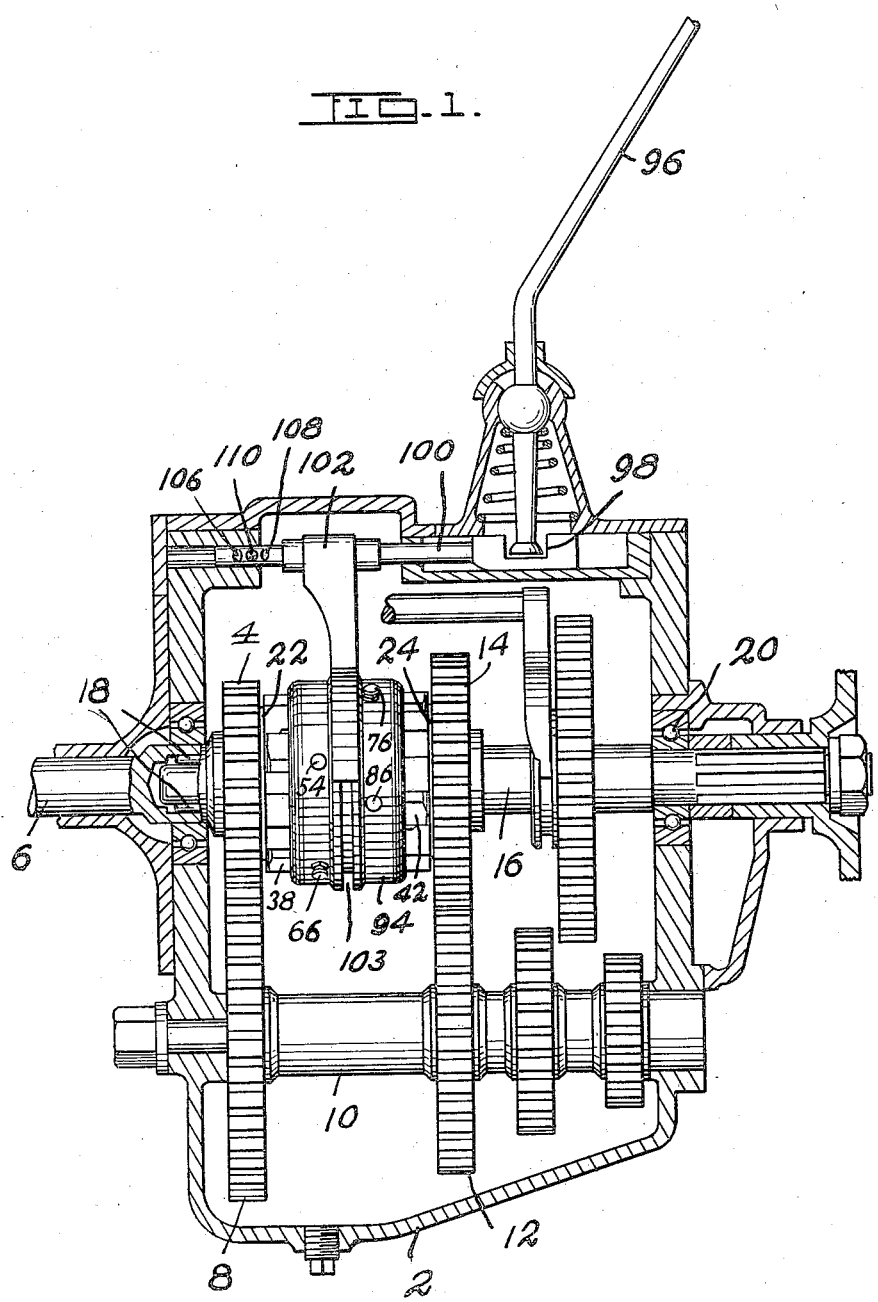

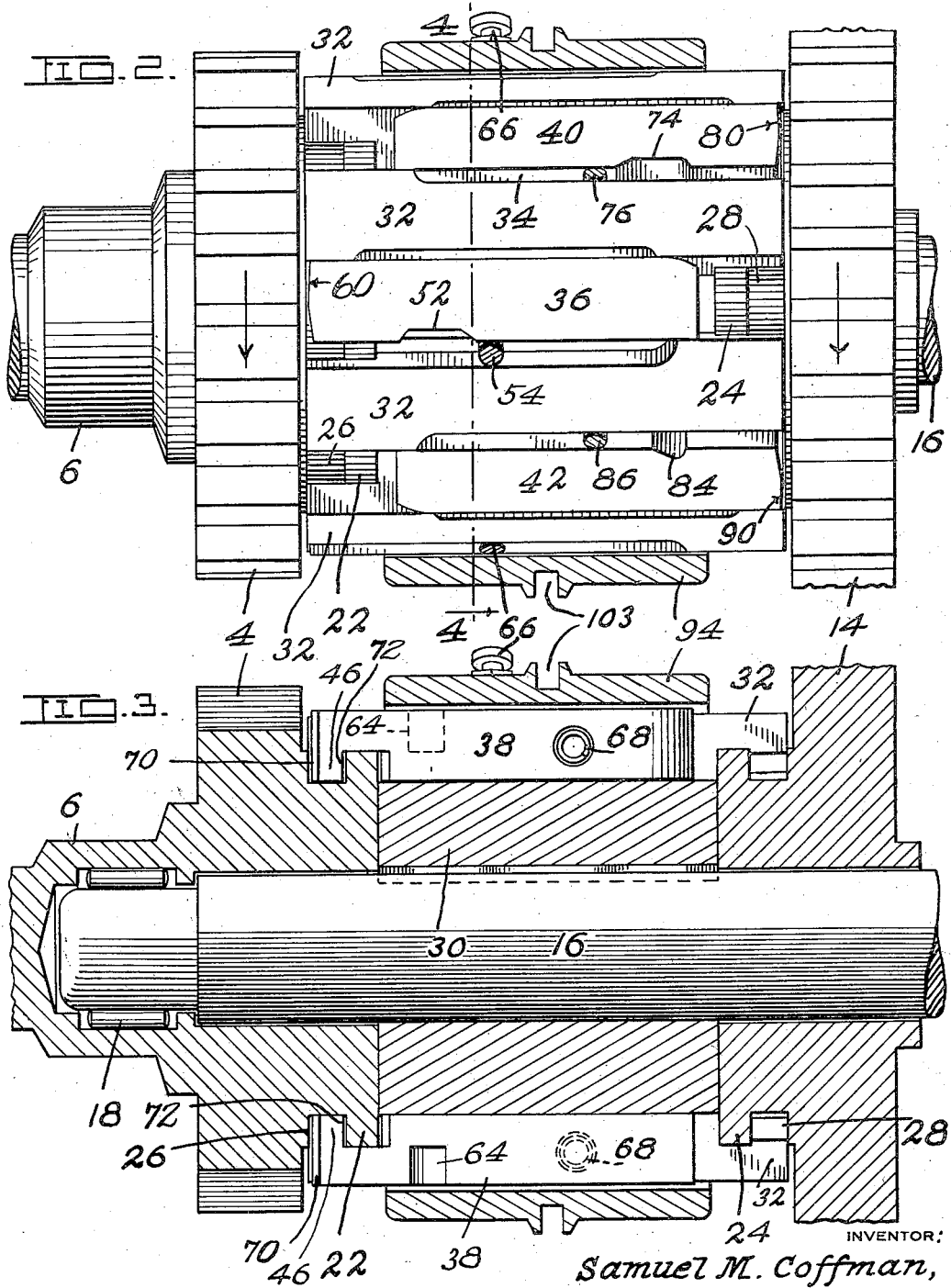

INVENTOR:
Samuel M. Coffman,
BY
F. G. Fischer,
ATTORNEY.

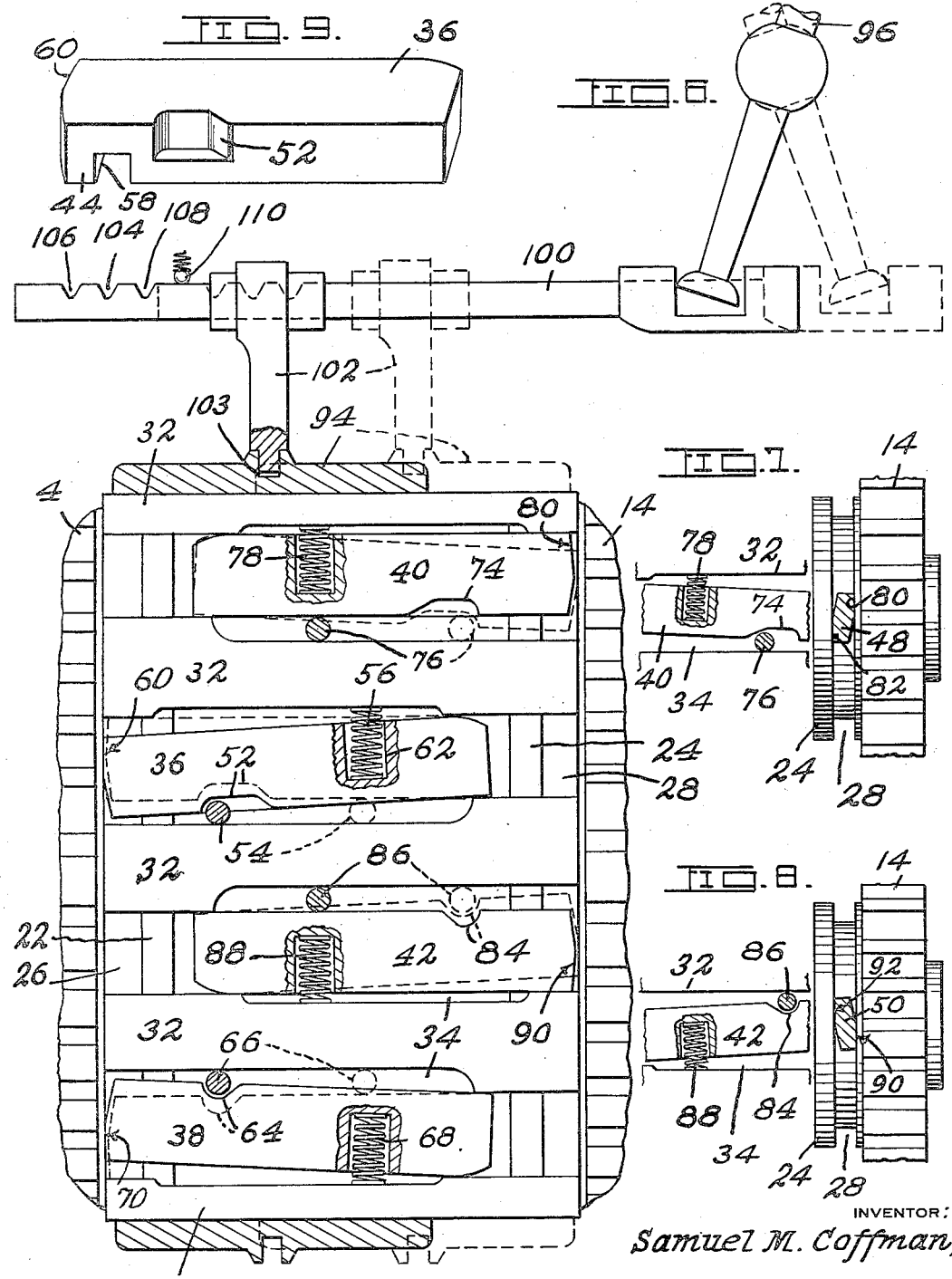

Patented July 23, 1935

2,009,107

UNITED STATES PATENT OFFICE 2,009,107

FREEWHEELING TRANSMISSION MECHANISM

Samuel M. Coffman, Kansas City, Mo.

Application May 7, 1932, Serial No. 609,928

8 Claims. (Cl. 192—48)

My invention relates to free wheeling transmission mechanisms and while it may be applied to a variety of machines, it is especially useful on automotive vehicles where smooth operation and economy is obtained by allowing the vehicle to coast while the engine is idling.

One object of the invention is to construct and arrange the parts of the mechanism in such manner that the driver of the vehicle may adjust said mechanism both to free wheeling and conventional driving positions through the sole operation of the conventional gear-shift lever and thus be relieved of the necessity of operating other manual controls, or throwing out the conventional clutch when making the change from one position to the other.

Another object is to arrange the parts in such manner as to enable the driver to shift from conventional second speed to conventional high speed, or vice versa, without the necessity of declutching the conventional clutch or waiting for parts rotating at different speeds to become synchronized.

A further object is to so arrange the parts that in the event the driver should shift from free wheeling position to either conventional high speed or conventional second speed while the engine and the vehicle are running at greatly different speeds, the clutch elements of my mechanism will not positively take hold until the speed of the engine and the vehicle are more nearly equalized, thereby avoiding the objectionable abrupt braking of either the engine or the vehicle and insuring smooth running qualities.

Another object is to produce a compact mechanism which can be installed directly within the transmission case and upon one of the usual transmission shafts, thereby saving the cost of providing additional shafting, bearings and housings required when following the common practice of installing the free-wheeling mechanism in a separate housing secured to the rear end of the transmission case.

Other objects will hereinafter appear, and in order that the invention may be fully understood reference will now be had to the accompanying drawings, in which:

Fig. 1 is a vertical longitudinal section of a transmission case equipped with my free wheeling transmission mechanism.

Fig. 2 is an enlarged side elevation of the free wheeling transmission mechanism.

Fig. 3 is a vertical sectional view on line 3—3 of Fig. 4.

Fig. 6 is a diagrammatic view showing the operation of certain parts of the free wheeling mechanism in full and dotted lines.

Fig. 7 is a broken detail of the second speed gear wheel and a clutch member associated therewith.

Fig. 8 is a broken detail of the second speed gear wheel and another clutch member associated therewith.

Fig. 9 is a detail perspective view of one of the clutch members.

Figure 4:
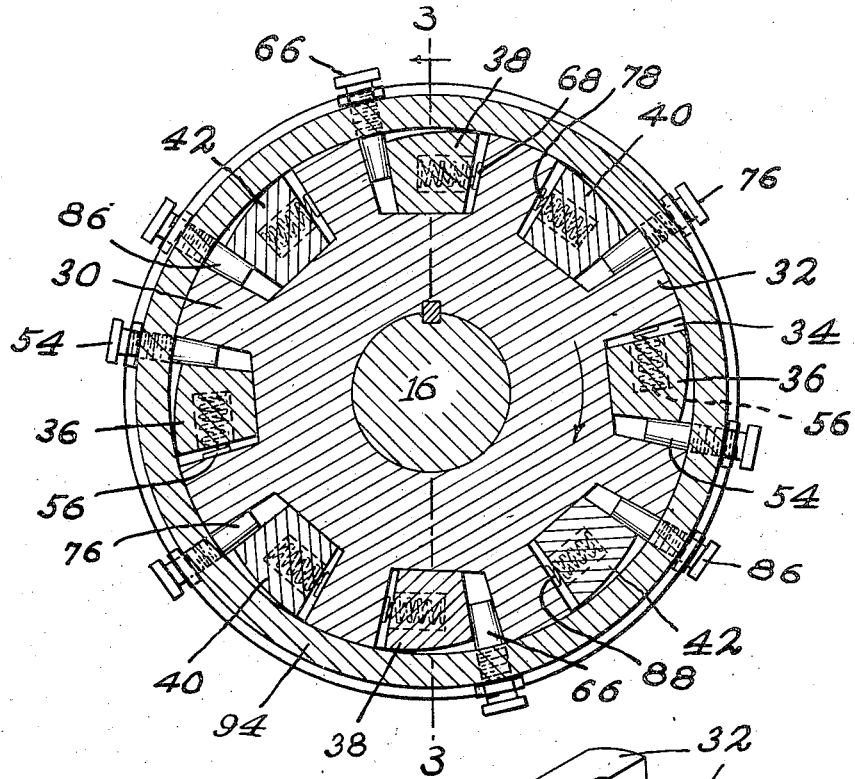
Fig. 4 is a cross section on line 4—4 of Fig. 2.
Figure 5:
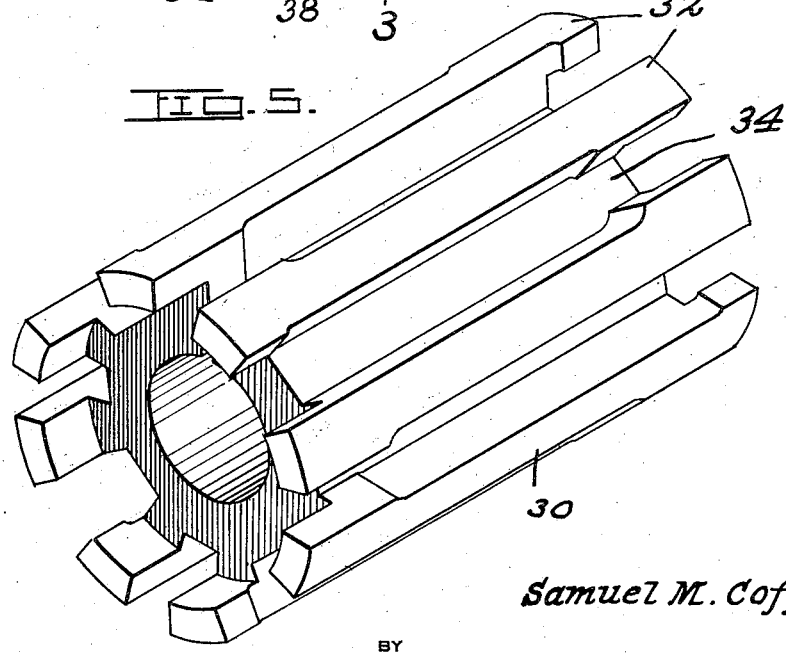
Fig. 5 is a detail perspective view of a spider in which a plurality of primary and secondary clutch members are operably mounted.

As hereinbefore stated my free wheeling transmission mechanism may be used in connection with different kinds of machinery, but in the present instance I have shown it installed in the transmission case 2 of an automotive vehicle. Mounted within said transmission case 2 is a first or high speed driving gear 4 fixedly mounted upon a drive shaft 6 and intermeshing with an intermediate gear wheel 8 fixedly mounted upon a tubular shaft 10 provided with a fixedly mounted intermediate gear wheel 12 intermeshing with a second speed driving gear 14 loosely mounted upon a driven shaft 16 journaled at its forward end in a pilot bearing 18, in the adjacent end of the shaft 6, and at its rear portion in a bearing 20 in the rear portion of the transmission case 2.

The shafts 6 and 16, the first driving gear 4, the second driving gear 14 and the intermediate gear wheels 8 and 12 may be of conventional construction, excepting that said first driving gear 4 and the second driving gear 14 are equipped with circular friction clutch members 22 and 24 having annular grooves 26 and 28, respectively, for cooperation with friction clutch elements hereinbefore referred to.

As I do not consider it important to have free-wheeling operation in low gear or reverse gear, the latter, in the present instance, are arranged to operate in the conventional manner although it is to be understood that free-wheeling operation may be had with these gears by locating my free wheeling unit at the rear of the driven shaft 16 instead of at the forward portion thereof as shown.

30 designates a rotatable member preferably in the form of a spider which may be formed integral with the driven shaft 16, or be keyed thereon as shown. The main body portion of the spider 30 is interposed between the clutch members 22 and 24 and has a plurality of longitudinal peripheral shoulders 32, the ends of which extend over the circular clutch members 22 and 24 to provide stops for the associated ends of a plurality of reversely disposed clutch elements hereinafter described in detail.

The shoulders 32 are spaced apart to provide grooves 34 in which the reversely disposed clutch elements are operably mounted as shown more clearly by Figs. 2, 4 and 6. In the present instance I have shown one pair of diametrically opposed primary friction clutch elements 36, one pair of diametrically opposed secondary friction clutch elements 38, a second pair of diametrically opposed primary friction clutch elements 40, and another set of diametrically opposed secondary friction clutch elements 42. In order to hereinafter more readily distinguish between the foregoing clutch elements I shall refer to the clutch elements 36 and 38 as the high speed clutch elements since they cooperate with the circular clutch member 22 of the first or high speed driving gear 4, and refer to the clutch elements 40 and 42 as the second speed clutch elements as they cooperate with the circular clutch member 24 of the second speed gear 14.

The high speed clutch elements 36 and 38 have fixed jaws 44 and 46, respectively, at one end which project into the annular groove 26 of the clutch member 22, while the second speed clutch elements 40 and 42 have fixed jaws 48 and 50, respectively, which project into the annular groove 28 of the clutch member 24. Each high speed clutch element 36 has an elongated notch 52 in one side thereof for the reception of a stud 54 which projects inwardly between the notched side of said clutch element 36 and the adjacent side of the associated shoulder 32, towards which latter the clutch element 36 is urged by a coil spring 56 to press the faces 58 and 60 of the jaw 44 into frictional engagement with the oppositely-disposed walls of the annular groove 26. Each spring 56 is seated in a recess 62 in the respective high speed clutch element 36 and presses at its outer end against the adjacent side of the associated shoulder 32 of the spider 30, as disclosed by Fig. 6 which also shows the high speed clutch elements 36 and 38 in active position in full lines and in inactive position by dotted lines.

Each high speed clutch element 38 is provided with a short notch 64 for the reception of a respective stud 66 projecting inwardly between the notched side of said clutch element 38 and the adjacent side of the associated shoulder 32. Each high speed clutch element 38 is urged towards the respective stud 66 by a coil spring 68 to press the faces 70 and 72 of the jaw 46 into frictional engagement with the oppositely-disposed walls of the annular groove 26.

Each second speed clutch element 40 has an elongated notch 74 for the reception of a respective stud 76 towards which said second speed clutch element 40 is urged by a spring 78 to press the faces 80 and 82 of the jaw 48 into frictional engagement with the oppositely disposed side walls of the groove 28, as shown by dotted lines Fig. 6.

Each second speed clutch element 42 has a short notch 84 for the reception of a stud 86 projecting inwardly between the notched side of said clutch element and the adjacent side of the associated shoulder 32, and each second speed clutch element 42 is urged towards the associated stud 86 by a spring 88 to press the faces 90 and 92 of the jaw 50 against the oppositely disposed side walls of the groove 28.

The studs 54, 66, 76 and 86 project inwardly from a shiftable member arranged preferably in the form of a sleeve 94 which is slidably mounted upon the spider 30 and holds all of the high speed and second speed clutch elements in assembly with said spider 30. The sleeve 94 may be actuated by any suitable means, but when my free wheeling unit is installed in the transmission case 2 I prefer to actuate it primarily by means of the usual gear-shift lever 96.

As shown on Fig. 1, the lower end of the lever 96 is adapted to be thrown into engagement with the recessed portion 98 of the usual direct and second speed gear-shift bar 100, which has a fixedly mounted shifting fork 102 operably engaging the peripherally grooved portion 103 of the sleeve 94. The shift bar 100 is provided with three customary notches 104, 106 and 108 for the reception of the usual spring pressed detent 110. In the present instance the notches 52 and 64 of the high speed clutch elements 36 and 38, and the notches 74 and 84 of the second speed clutch elements 40 and 42, respectively, are spaced in certain relation to each other and the notches 104, 106 and 108 of the bar 100. The studs 54, 66, 76 and 86 are spaced in certain relation to each other and the notches 52, 64, 74 and 84 so that when the lever 96 is shifted to neutral position (Fig. 1) to carry the notched portion 104 into engagement with the detent 110 the sleeve 94 will be shifted through the medium of the fork 102 to a point midway between the first driving gear 4 and the second driving gear 14 as shown by Figs. 1 to 3, inclusive. Shifting of the sleeve 94 to neutral position carries the studs 54, 66, 76 and 86 to a position where they will hold all of the respective high speed and second speed clutch elements in neutral or inactive position so that the engine of the motor vehicle may idle while the vehicle is standing still, or coasting.

Assuming that it is desired to start the vehicle forward in low speed the lever 96 is engaged with the usual first speed and reverse shift-bar, not shown, with affecting the neutral position of the sleeve 94, but when the lever 96 is shifted forward to change from low speed to second speed forward the bar 100 is engaged and carried backwardly by the lower end of said lever until the notched portion 106 is engaged by the detent 110. As the bar 100 is carried backwardly, as stated, it moves the sleeve 94 therewith which in turn carries the studs 76 into registry with the adjacent end portions of the elongated notches 74. The springs 78 then throw the second speed clutch elements 40 into frictional engagement with the circular clutch member 24 (see dotted lines, Fig. 6), so that the second driving gear 14 will drive the shaft 16 through the medium of the clutch member 24, the clutch elements 40 and the spider 30.

When the lever 96 is pulled backwardly to shift from second to high or direct speed the bar 100 is moved forward until its notched portion 108 is engaged by the detent 110. As the bar 100 moves forward it effects the forward movement of the sleeve 94, which causes the studs 76 to force the second speed clutch elements 40 to neutral or inactive position and carry the studs 54 into registry with the adjacent end portions of the elongated notches 52. The springs 56 then adjust the high speed clutch elements 36 into frictional engagement with the clutch member 22 so that the first driving gear 4 will drive the shaft 16 through the medium of the clutch member 22, the clutch elements 36, and the spider 30.

When driving either in second or high gear through the medium of the clutch elements 40 or 36, respectively, free-wheeling operation may be had by letting the vehicle coast while the engine is idling, as when driving in second gear the clutch elements 40 are free to over-run the clutch member 24 and when driving in high or direct drive the clutch elements 36 are free to over-run the clutch member 22.

To shift from free-wheeling position to conventional driving position when in second gear, the lever 96 is shifted forward to carry the bar 100 to extreme rearward position (see dotted lines, Fig. 6), so that the studs 86 will be carried into registry with the notches 84, whereupon the springs 88 instantly throw the clutch elements 42 into frictional engagement with the clutch member 24. The latter operation is accomplished without throwing the clutch elements 40 out of active engagement with the clutch member 24 as the elongated slots 74 permit the studs 76 to move towards the clutch member 24 without changing the active position of said clutch elements 40.

To shift from free-wheeling to conventional operation while in high or direct gear the lever 96 is shifted rearwardly to carry the shift bar 100 to extreme forward position (see full lines, Fig. 6) so that the studs 66 will be carried into registry with the notches 64, whereupon the clutch elements 38 are instantly thrown into frictional engagement with the clutch member 22 through the medium of the springs 68. This operation is permitted without affecting the active position of the clutch elements 36 as the studs 54 merely move towards the forward ends of the elongated slots 52.

It is to be understood that change may be quickly made from second speed to high speed conventional driving, or vice versa, without checking the movement of the lever 86, when passing through the free-wheeling positions. The latter is an important feature as it enables the driver when going down a steep grade to utilize the braking action of the engine more effectively by shifting from high speed to second speed conventional without the necessity of throwing out the conventional clutch or waiting for the speed of the clutch members 22 and 24 to become fully synchronized with the speed of the respective clutch elements. However, I have found that when there is a great difference between the speeds of the clutch members 22 and 24 and their respective clutch elements, as when the engine is idling and the vehicle is coasting at high speed, or vice versa, that the clutch elements 36 or 40 will slidably engage the respective clutch members 22 and 24 until the difference has been reduced to a point where no damage or shock to the vehicle or passengers will result when the clutch elements and the clutch members become actively engaged.

While I have shown one form of my invention, I do not wish to be understood as intending to limit myself to such form, but reserve all rights to such changes and modifications as properly fall within the spirit and scope of the invention as claimed.

Having thus described my invention, what I claim and desire to secure by Letters Patent, is:

1. A transmission mechanism of the character described comprising rotary driving and driven means arranged in axial alinement, a member fixedly mounted upon one of said means to rotate therewith and provided with a plurality of grooves in parallelism with the axis of said means, primary clutch means operably mounted in a number of said grooves and adapted to transmit motion from the driving means to the driven means in one direction and permit over-run of the driving means by the driven means when the speed of the latter exceeds that of said driving means, secondary clutch means operably mounted in a number of the grooves and movable to active position to prevent over-run and to inactive position to permit over-run of said driving means by said driven means, a member slidably embracing the grooved member and adapted to hold the primary and secondary clutch means in assembly with said grooved member, suitable means for shifting said slidable member in reverse directions, and elements extending inwardly from said slidable member and adapted when moved in one direction to adjust the secondary clutch means to inactive position and when moved in a reverse direction to permit said secondary clutch means to move to active position.

2. A transmission mechanism of the character described comprising rotary driving and driven means arranged in axial alinement, a member fixedly mounted upon one of said means to rotate therewith and provided with a plurality of grooves in parallelism with the axis of said means, primary clutch means operably mounted in a number of said grooves and adapted to transmit motion from the driving means to the driven means in one direction and permit over-run of the driving means by the driven means when the speed of the latter exceeds that of said driving means, secondary clutch means operably mounted in a number of the grooves and movable to active position to prevent over-run and to inactive position to permit over-run of said driving means by said driven means, a member slidably embracing the grooved member and adapted to hold the primary and secondary clutch means in assembly with said grooved member, suitable means for shifting said slidable member in reverse directions, elements extending inwardly from said slidable member and adapted when moved in one direction to adjust the secondary clutch means to inactive position and when moved in a reverse direction to permit said secondary clutch means to move to active position, and spring means interposed between certain walls of the grooves and said secondary clutch means for moving the latter to active position.

3. A transmission mechanism of the character described comprising rotary driving and driven means arranged in axial alinement, a member fixedly mounted upon one of said means to rotate therewith, primary clutch means including an element having a recess and operably mounted in said fixedly mounted member to transmit motion from the driving to the driven member in one direction and permit over-run of said driving member by the driven member when the speed of the later exceeds that of the driving member, a suitably controlled member shiftably mounted upon said fixedly mounted member, an element on said shiftable member projecting inwardly between the fixedly mounted element and one side of the primary clutch element to hold the latter in inactive position when the shiftable member is shifted to one position, spring means interposed between the opposite side of the primary clutch element and the fixedly mounted element for adjusting said primary clutch element to active position when the shiftable member is shifted to another position to carry the inwardly projecting element into registry with the recess in said primary clutch element, a secondary clutch means including an element having a recess and operably mounted in said fixedly mounted member and movable to active position to prevent over-run and to inactive position to permit over-run of said driving member by said driven member, an element projecting inwardly from said shiftable member and adapted to hold the secondary clutch element in inactive position until the shiftable member has been further shifted to carry the last-mentioned inwardly projecting element into registry with said recess in said secondary clutch element, and spring means for adjusting the secondary clutch element to active position when the last-mentioned inwardly projecting element is in registry with said recess in said secondary clutch element.

4. A transmission mechanism of the character described comprising rotary driving and driven means arranged in axial alinement, a member fixedly mounted upon one of said means to rotate therewith, primary clutch means including an element having a recess and operably mounted in said fixedly mounted member to transmit motion from the driving to the driven member in one direction and permit over-run of said driving member by the driven member in the same direction, a sleeve shiftably mounted upon said fixedly mounted member, a member for shifting said sleeve in opposite directions, a suitably mounted slide-bar for actuating said shifting member, a manually controlled lever for actuating said slide-bar, an element on said sleeve projecting inwardly between the fixedly mounted member and one side of the primary clutch element to hold the latter in inactive position when the sleeve is shifted to one position, spring means interposed between the opposite side of the primary clutch element and the fixedly mounted member for adjusting said primary clutch element to active position when the sleeve is shifted to another position to carry the inwardly projecting element into registry with the recess in said primary clutch element, secondary clutch means including an element having a recess and operably mounted in said fixedly mounted member and movable to active position to prevent over-run and to inactive position to permit over-run of said driving member by said driven member, an element projecting inwardly from said sleeve and adapted to hold the secondary clutch element in inactive position until the sleeve has been further shifted to carry the last-mentioned inwardly projecting element into registry with the recess in said secondary clutch element, and spring means for adjusting the secondary clutch element to active position when the last-mentioned inwardly projecting element is in registry with the recess in said secondary clutch element.

5. In a transmission mechanism of the character described, a driving clutch member, a shaft in axial alinement with said clutch member, a clutch element arranged to frictionally engage said clutch member and drive said shaft, said clutch element having a recess and being free to overrun said clutch member when the speed of the latter falls below the speed of the former, a sleeve loosely embracing the clutch element and adapted to be shifted longitudinally of the shaft, manually controlled means for shifting said sleeve in opposite directions, means on said sleeve for disengaging the clutch element from the clutch member when the sleeve is shifted in one direction, said means registering with the recess in the clutch element so that the latter may frictionally engage the clutch member when the sleeve is shifted in the opposite direction, and resilient means for throwing said clutch element into engagement with the clutch member.

6. In a transmission mechanism of the character described, a driving clutch member, a shaft in axial alinement with said clutch member, a primary clutch element arranged to frictionally engage said clutch member and drive said shaft, said primary clutch element being free to overrun said clutch member when the speed of the latter falls below the speed of the former, resilient means for engaging said primary clutch element with said driving clutch member, a sleeve loosely embracing the primary clutch element and adapted to be shifted longitudinally of the shaft, manually controlled means for shifting said sleeve in opposite directions, means on said sleeve for disengaging the primary clutch element from the clutch member when the sleeve is shifted in one direction, a secondary clutch element adapted to frictionally engage the clutch member and prevent over-run thereof by the primary clutch element, resilient means for engaging said secondary clutch element with the clutch member, and means on the sleeve whereby the secondary clutch element may be disengaged from the clutch member without disengaging the primary clutch element from said clutch member.

7. In a transmission mechanism of the character described, a driving clutch member, a shaft in axial alinement with said driving clutch member, primary clutch elements arranged to frictionally engage said driving clutch member and drive said shaft, said primary clutch elements being free to over-run said driving clutch member when the speed of the latter falls below the speed of the former, resilient means for engaging said primary clutch elements with said driving clutch member, a sleeve loosely embracing the primary clutch elements and adapted to be shifted longitudinally of the shaft, manually controlled means for shifting said sleeve in opposite directions, means on said sleeve for disengaging the primary clutch elements from the driving clutch member when the sleeve is shifted in one direction, secondary clutch elements adapted to frictionally engage the driving clutch member and prevent over-run thereof by the primary clutch elements, resilient means for engaging said secondary clutch elements with the driving clutch member, and means on the sleeve whereby the secondary clutch elements may be disengaged from the driving clutch member without disengaging the primary clutch elements from said driving clutch member.

8. In a transmission mechanism, a first driving gear having an annular groove, a second driving gear having an annular groove, a driven shaft upon which said second driving gear is loosely mounted, a rotatable member interposed between the first and second gears and fixed upon said shaft to drive the same, primary clutch elements operably mounted on said rotatable member and having jaws projecting into the annular groove of the first driving gear, spring means to effect frictional engagement of said jaws with walls of the annular groove in the first driving gear so that the latter may drive the rotatable member, devices to effect disengagement of the jaws from said walls, secondary clutch elements operably mounted on said rotatable member and having jaws projecting into the annular groove of the first driving gear, spring means to effect frictional engagement of the last-mentioned jaws with the walls of the annular groove in the first driving gear, devices to effect disengagement of the last-mentioned jaws from said walls, a suitably actuated sleeve for controlling all of said devices, means coacting with said devices for effecting disengagement of the last-mentioned jaws from the walls before disengagement of the first-mentioned jaws, a second set of primary clutch elements having jaws projecting into the annular groove of the second driving gear, spring means to effect frictional engagement of the last-mentioned jaws with walls of the last-mentioned groove so that the second driving gear may drive the rotatable member, devices to effect disengagement of the last-mentioned jaws from the last-mentioned walls, a second set of secondary clutch elements having jaws projecting into the groove of the second driving gear, spring means to effect frictional engagement of the last-mentioned jaws with the last-mentioned walls, devices controlled by the sleeve to effect disengagement of the jaws from the last-mentioned walls, and means coacting with said devices for effecting disengagement of the second set of secondary jaws from the last-mentioned walls before disengagement of the jaws of the second set of primary clutch elements.

SAMUEL M. COFFMAN.